US012567242B2

(12) United States Patent
Shu et al.

(10) Patent No.: US 12,567,242 B2
(45) Date of Patent: Mar. 3, 2026

(54) DATA AUGMENTATION FOR OCCLUSION HANDLING IN FEATURE EXTRACTION

(71) Applicant: ECOPIA TECH CORPORATION,
Toronto (CA)

(72) Inventors: Yuanming Shu, Toronto (CA); Yaolong Wang, Beijing (CN); Hongbo Wang, Hebi (CN)

(73) Assignee: ECOPIA TECH CORPORATION,
Toronto (CA)

( * ) Notice: Subject to any disclaimer, the term of this patent is extended or adjusted under 35 U.S.C. 154(b) by 428 days.

(21) Appl. No.: 18/325,182

(22) Filed: May 30, 2023

(65) Prior Publication Data

US 2024/0233339 A1 Jul. 11, 2024

Related U.S. Application Data

(60) Provisional application No. 63/498,161, filed on Apr. 25, 2023, provisional application No. 63/479,286, filed on Jan. 10, 2023.

(51) Int. Cl.
*G06V 20/10* (2022.01)
*G06V 10/774* (2022.01)
(52) U.S. Cl.
CPC .......... *G06V 10/774* (2022.01); *G06V 20/176* (2022.01)
(58) Field of Classification Search
None
See application file for complete search history.

(56) References Cited

U.S. PATENT DOCUMENTS

| | | |
|---|---|---|
| 11,631,235 B2 | 4/2023 | Vianello et al. |
| 2017/0061625 A1 | 3/2017 | Estrada et al. |
| 2019/0392596 A1 | 12/2019 | Yang et al. |

(Continued)

FOREIGN PATENT DOCUMENTS

WO WO2021132829 A1 1/2021

OTHER PUBLICATIONS

Kortylewski, Adam, et al. "Compositional convolutional neural networks: A robust and interpretable model for object recognition under occlusion." International Journal of Computer Vision 129.3 (2021): 736-760. (Year: 2021).*

(Continued)

*Primary Examiner* — Sean M Conner
(74) *Attorney, Agent, or Firm* — Damian Rolfe

(57) ABSTRACT

Example systems and methods for data augmentation for occlusion handling in feature extraction are provided. An example method involves accessing a tree cover source image that depicts one or more areas of tree cover, extracting a tree cover map from the tree cover source image that labels areas of the tree cover source image as either areas covered by tree cover or not covered by tree cover, selecting a contiguous area of tree cover from the tree cover map to use as simulated tree cover, accessing a geospatial image depicting a building, placing the simulated tree cover in the geospatial image to generate a tree cover-augmented geospatial image, wherein the simulated tree cover partially occludes a rooftop of the building as depicted in the geospatial image, and training a machine learning model, using the tree cover-augmented geospatial image, to extract building rooftop polygons outlining buildings as depicted in geospatial imagery.

15 Claims, 12 Drawing Sheets

(56)          References Cited

U.S. PATENT DOCUMENTS

| | | |
|---|---|---|
| 2021/0118165 A1 | 4/2021 | Strong |
| 2021/0133936 A1 | 5/2021 | Chandra et al. |
| 2021/0383616 A1 | 12/2021 | Rong et al. |
| 2022/0156526 A1 | 5/2022 | Chen et al. |
| 2022/0207294 A1 | 6/2022 | Kim et al. |
| 2022/0292306 A1 | 9/2022 | Radhakrishnan et al. |
| 2023/0026278 A1* | 1/2023 | Vianello ............... G06V 20/176 |
| 2023/0057612 A1* | 2/2023 | Byun ..................... G06N 3/047 |
| 2023/0290110 A1 | 9/2023 | Case et al. |
| 2023/0386163 A1 | 11/2023 | Wu |

OTHER PUBLICATIONS

Wangiyana, Sandhi, Piotr SamczyÅski, and Artur Gromek. "Data augmentation for building footprint segmentation in SAR images: An empirical study." Remote Sensing 14.9 (2022): 2012. (Year: 2022).*

PCT/IB2024/050213, Invitation To Pay Additional Fees And, Where Applicable, Protest Fee.

PCT/IB2024/050213, International Search Report.

PCT/IB2024/050213, Written Opinion of the International Searching Authority.

* cited by examiner

Image
(256x256x3)

Building Rooftop Polygon
(vector data)

Building Rooftop
Polygon Extraction
Process

Image
(256x256x3)

Building Footprint
(vector data)

Occlusion-Handing
Feature Extraction
Process

Image

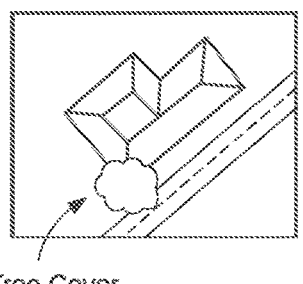

Tree Cover

Building Rooftop Polygon

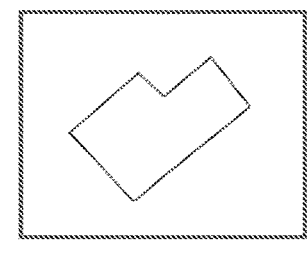

Occlusion-Handling Building Rooftop Polygon Extraction Process

FIG. 12A

Image

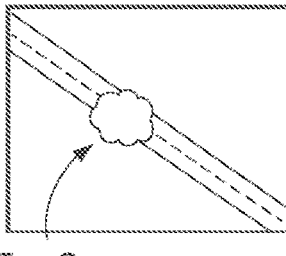

Tree Cover

Road Map

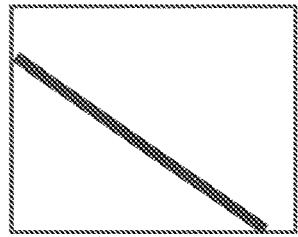

Occlusion-Handling Road Extraction Process

FIG. 12B

Image
(256x256x3)

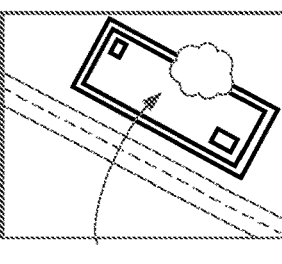

Cloud Cover

Building Rooftop Polygon
(vector data)

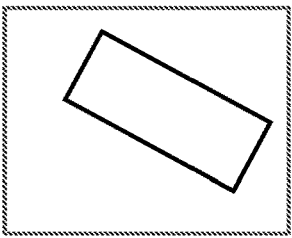

Occlusion-Handing Building Rooftop Polygon Extraction Process

FIG. 12C

Image
(256x256x3)

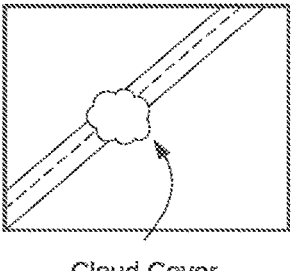

Cloud Cover

Road Map
(vector data)

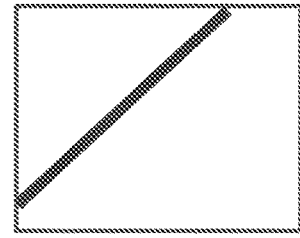

Occlusion-Handing Road Extraction Process

FIG. 12D

DATA AUGMENTATION FOR OCCLUSION HANDLING IN FEATURE EXTRACTION

CROSS-REFERENCE TO RELATED APPLICATIONS

This application claims priority to U.S. Provisional Patent Application No. 63/479,286, filed Jan. 10, 2023, and U.S. Provisional Patent Application No. 63/498,161, filed Apr. 25, 2023. The contents of each of the aforementioned applications are incorporated herein by reference in their entirety.

BACKGROUND

Geospatial information is commonly presented as raster data or as vector data. Raster data presents an area of the world as a regular grid of cells, with attributes associated with each cell. A common example of geospatial information presented as raster data is an aerial image. Raster data can also be used to present semantic information extracted from imagery (i.e., raster labels) such as in landcover classification maps. In contrast, vector data can be used to present semantic information extracted from imagery as a set of geometric entities (e.g., polygons, lines, points) with associated attributes. A common example of geospatial information presented as vector data is building footprint data, which represents the shape and location of buildings in an area. Vector data may be preferred over raster data in many applications for its scalability, compactness, and the ease with which vector data can be edited and manipulated.

BRIEF DESCRIPTION OF THE DRAWINGS

FIGS. 12A, 12B, 12C, and 12D illustrate the application of various alternative occlusion-handling feature extractors.

DETAILED DESCRIPTION

Several forms of semantic information can be extracted from geospatial imagery. Landcover data, which may include raster data or vector data representations of buildings, roads, and other manmade or natural features, is an example of such semantic information. Landcover data has all sorts of practical applications, from municipal land use planning to residential property assessments to recreating digital twins of cities.

Figure 1A:
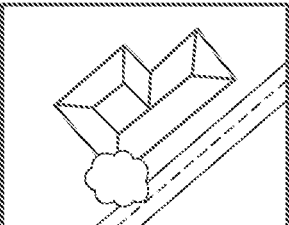
FIG. 1A illustrates a prior art building rooftop polygon extraction process. The extracted building rooftop polygon appears distorted because the building rooftop is partially occluded by tree cover.
Figure 1A:
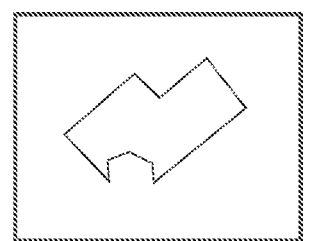
Figure 1B:
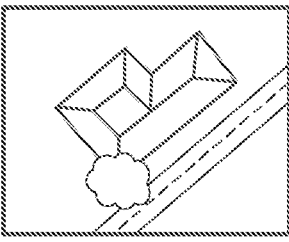
FIG. 1B illustrates an occlusion-handling building rooftop polygon extraction process. The building rooftop polygon is extracted accurately despite being occluded partially by tree cover.
Figure 1B:
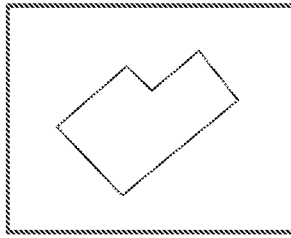

However, the quality of landcover data can be impacted by the presence of occlusions in the imagery that is used for feature extraction. One common example is the case of tree cover occluding the rooftop of a building. FIG. 1A illustrates such a scenario, in which a naive building rooftop polygon extraction process is applied to an image depicting a building that is partially occluded by tree cover. In this case, as is a common problem in the industry, the extracted building rooftop geometry is distorted by the occlusion.

One of the reasons this problem persists may be a lack of training data containing buildings which are partially occluded by tree cover. Thus, in the small number of cases in which the machine learning model comes across a building occluded by tree cover, the machine learning model is not adequately trained to handle the situation. The present disclosure, therefore, teaches the use of data augmentation techniques to design feature extraction processes in a way that desired landcover features can be extracted more accurately despite being partially occluded.

One common application that is the focus of the following disclosure is the scenario described above, namely, the case of tree cover occluding a building rooftop. The goal of the methods described herein is to at least reduce the incidence of geometric distortions in partially occluded features, and in particular, to reduce the incidence of rooftop polygon distortions when such rooftops are partially occluded by tree cover. However, it is to be understood that the systems and methods described herein may be applied to other combinations of occluding and occluded features (see, e.g., FIGS. 12A, 12B, 12C, and 12D).

Figure 2:
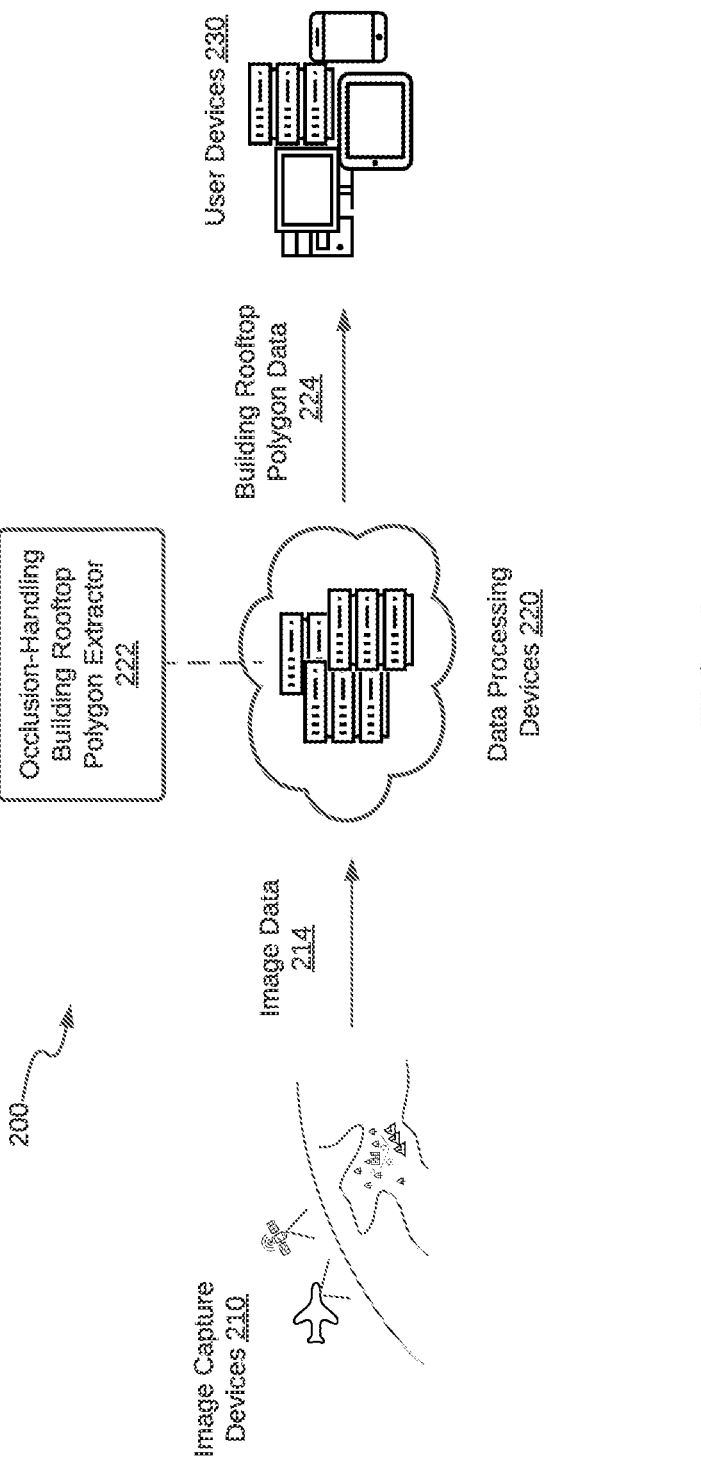
FIG. 2 is a schematic diagram of an example system for extracting building rooftop polygons from geospatial imagery using an occlusion-handling building rooftop polygon extractor.

FIG. 2 is a schematic diagram of an example system 200 for extracting building rooftop polygons from geospatial imagery using an occlusion-handling building rooftop polygon extractor. The system 200 includes one or more image capture devices 210 to capture image data 214 over one or more areas of interest. An image capture device 210 may include any suitable sensor (e.g., camera) onboard an aircraft, satellite, drone, observation balloon, or other device capable of capturing imagery of an area of interest from a distant overhead point of view (i.e., geospatial imagery).

The image data 214 may comprise the raw image data captured by such image capture devices 210 along with any relevant metadata, including camera parameters (e.g., focal length, lens distortion, camera pose, resolution), geospatial projection information (e.g., latitude and longitude position), or other relevant metadata. The type of imagery captured may include substantially nadir imagery, off-nadir imagery, or oblique imagery, or a combination thereof. The image data 214 may contain one or several batches of imagery covering the same or different areas, captured from the same or different points of view, which may have been captured on the same dates or on different dates.

The system 200 further includes one or more data processing devices 220 to process the image data 214 to generate building rooftop polygon data 224 as described herein. The data processing devices 220 include one or more computing devices, such as virtual machines or servers in a cloud computing environment comprising one or more processors for executing computing instructions. In addition to processing capabilities, the data processing devices 220 include one or more communication interfaces to receive/obtain/access the image data 214 and to output/transmit building rooftop polygon data 224 through one or more computing networks and/or telecommunications networks such as the internet. Such computing devices further include memory (i.e., non-transitory machine-readable storage media) to store programming instructions that embody the functionality described herein.

The one or more data processing devices 220 are configured to run (i.e., store, host or access) an occlusion-handling building rooftop polygon extractor 222, which represents one or more programs, software modules, or other set of non-transitory machine-readable instructions, configured to process the image data 214 to produce the building rooftop polygon data 224, such that the geometry of the building rooftop polygons is extracted accurately despite partial occlusion by tree cover. The occlusion-handling building rooftop polygon extractor 222 includes a machine learning model that performs feature extraction, and other functional units as will be described later in this disclosure.

In some cases, the data processing devices 220 may perform imagery pre-processing where necessary to prepare the received image data 214 for processing by the occlusion-handling building rooftop polygon extractor 222. For example, one or more of the images may be processed to produce a digital orthomap (DOM) or an orthomosaic that may be used in the later stages of building rooftop polygon extraction.

The data processing devices 220 may provide such building rooftop polygon data 224 to one or more user devices 230. A user device 230 may include one or more computing devices configured to run (i.e, store, host or access) one or more software programs to display, process, or otherwise use the building rooftop polygon data 224 (e.g., a GIS viewer). In some examples, a user device 230 may include a display device and user interface and may allow a user to view and manipulate the building rooftop polygon data 224.

Figure 3:
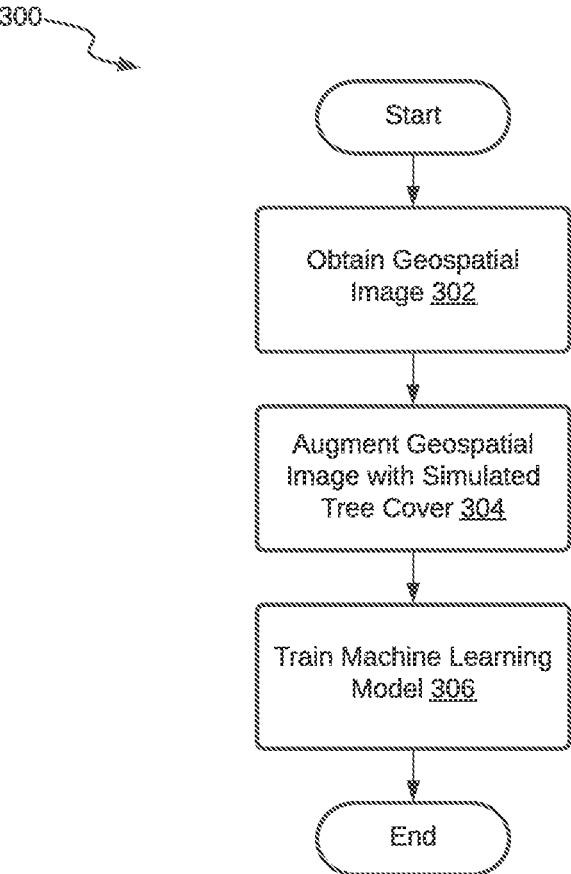
FIG. 3 is a flowchart of an example method for training a machine learning model to extract building rooftop polygons as part of an occlusion-handling building rooftop polygon extractor.

FIG. 3 is a flowchart of an example method 300 for training a machine learning model to extract building rooftop polygons as part of an occlusion-handling building rooftop polygon extractor. The method 300 describes a high-level overview of how data augmentation techniques may be applied to train a machine learning model to more effectively extract building rooftop polygons. These techniques are described in greater detail later in this disclosure.

Figure 4:
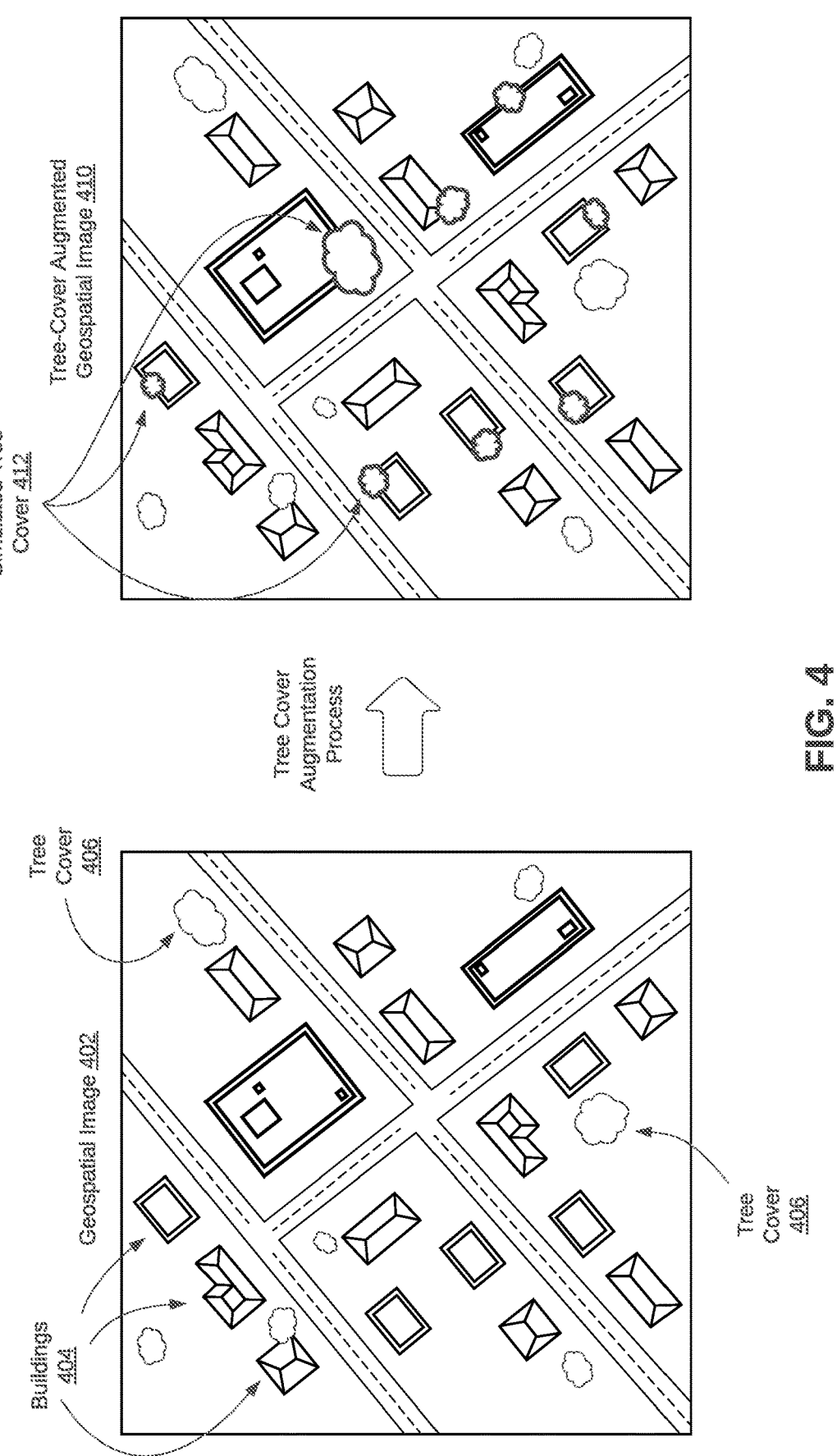
FIG. 4 illustrates an example tree cover augmentation process being applied to a geospatial image to generate a tree-cover augmented geospatial image. The tree-cover augmented geospatial image may be used to train a machine learning model that is part of an occlusion-handling building rooftop polygon extractor.

At operation 302, a geospatial image depicting a building is accessed. The geospatial image may comprise, for example, a single aerial or satellite image, an orthophoto, or an orthomosaic generated from several images. Such geospatial imagery will depict at least one building to be used for data augmentation as described below, but generally, a large number of buildings will be depicted. For illustrative purposes, reference may be had to FIG. 4, which depicts a geospatial image 402 depicting several buildings 404. The geospatial image 402 also depicts several areas of tree cover 406. Some of the buildings 404 may be partially occluded by tree cover 406. However, this is not necessary, and indeed it is not necessary for the geospatial image 402 to include areas of tree cover 406 at all, as simulated tree cover will be added in the following operation.

At operation 304, the geospatial image is augmented with simulated tree cover. Since in this scenario we are interested in extracting building rooftop polygons, the simulated tree cover should partially occlude at least some of the building rooftops depicted in the geospatial image. The resulting image may be referred to as a tree-cover augmented geospatial image. For illustrative purposes, reference may again be had to FIG. 4, which depicts a tree-cover augmented geospatial image 410 which was generated by applying a tree cover augmentation process to the geospatial image 402. As can be seen, the tree-cover augmented geospatial image 410 contains several instances of simulated tree cover 412 that partially occlude the rooftops of at least some of the buildings 404. Details as to how such simulated tree cover 412 was generated and applied will be discussed later in this disclosure.

At operation 306, a machine learning model is trained, using the tree cover-augmented geospatial image, to extract building rooftop polygons. Having the benefit of several instances of simulated tree cover partially occluding building rooftops, a machine learning model trained using such augmented data may be expected to outperform a machine learning model that is not trained with such augmented data when extracting rooftop polygons from buildings that are partially occluded by tree cover.

In some cases, the machine learning model may have been previously trained to naively extract building rooftop polygons from geospatial imagery (without any data augmentation). Thus, in operation 306, this machine learning model may continue to be trained (i.e., fine tuned) to perform better at handling instances of partial occlusion.

As previously mentioned, the method 300 is a high-level overview of processes to be described later in this disclosure. Further, the method 300 may be understood as describing one example way in which the machine learning model that is part of the occlusion-handling building rooftop polygon extractor 222 of FIG. 1 may be trained. It is to be noted, however, that the method 300 may be applied in other systems, and more generally, that the method 300 and any of its operations may be organized into one or more functional processes and embodied in non-transitory machine-readable programming instructions executable by one or more processors in any suitable configuration.

Figure 5:
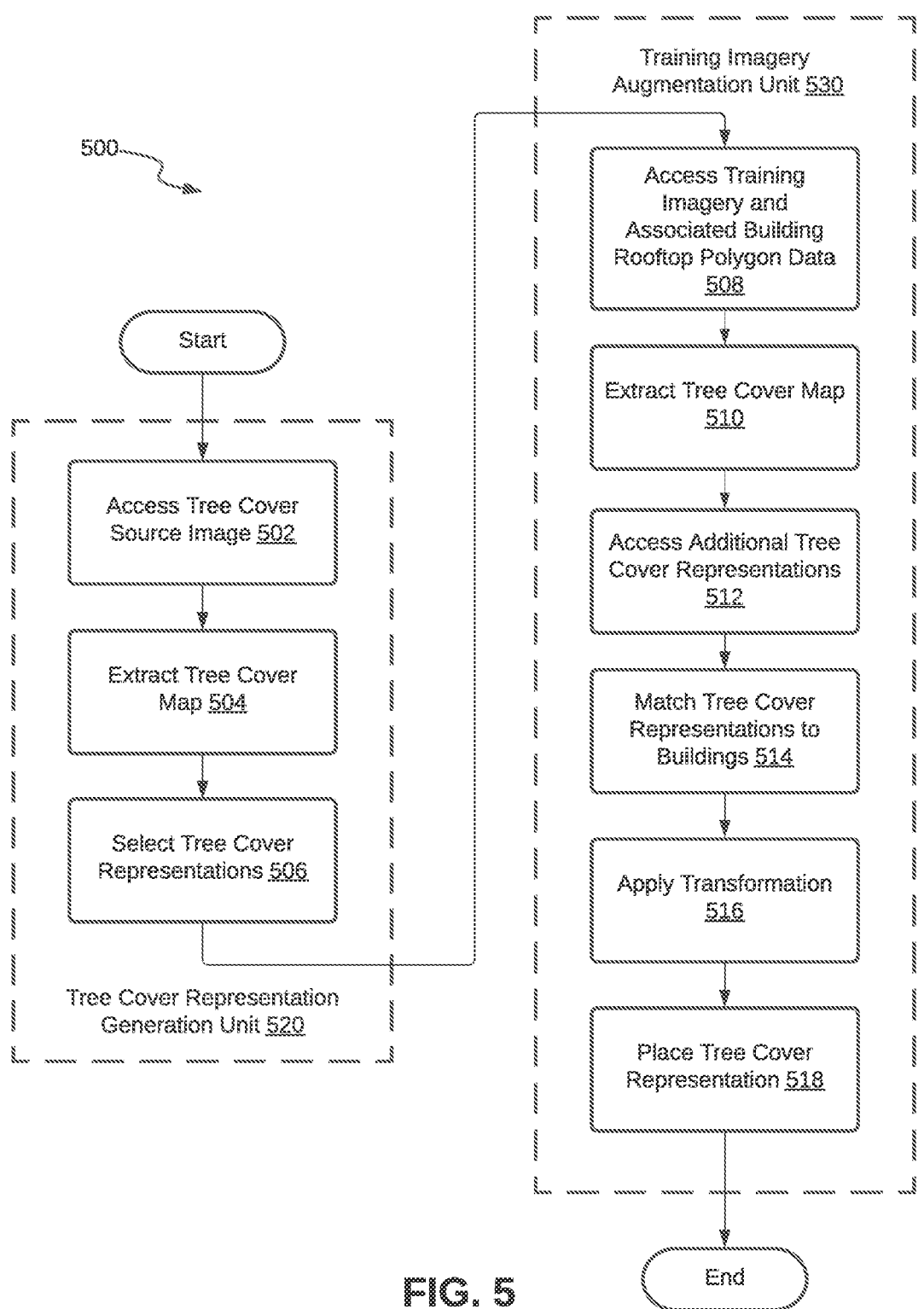
FIG. 5 is a flowchart of an example method for generating tree cover-augmented geospatial imagery for use as training data.

FIG. 5 is a flowchart of an example method 500 for generating tree cover-augmented geospatial imagery for use as training data. The training data generated as described here may be used to train a machine learning model to extract rooftop polygons from geospatial imagery that contains occlusion caused by tree cover.

The method 500 involves two major processes. First, tree cover representations are extracted from imagery, and a set of realistic tree cover representations is created, which can be accessed for further use. Second, this set of tree cover representations is used to augment training imagery with additional instances of tree cover occlusion. Therefore, for illustrative purposes, the method 500 is described as being performed by two broad functional units, namely a tree cover representation generation unit 520 and a training imagery augmentation unit 530. However, this depiction is for illustrative purposes only, and it is emphasized that the operations described in method 500 may be performed by any combination of one or more functional units, software systems, sets of non-transitory machine-readable instructions, and/or computing devices.

Figure 6:
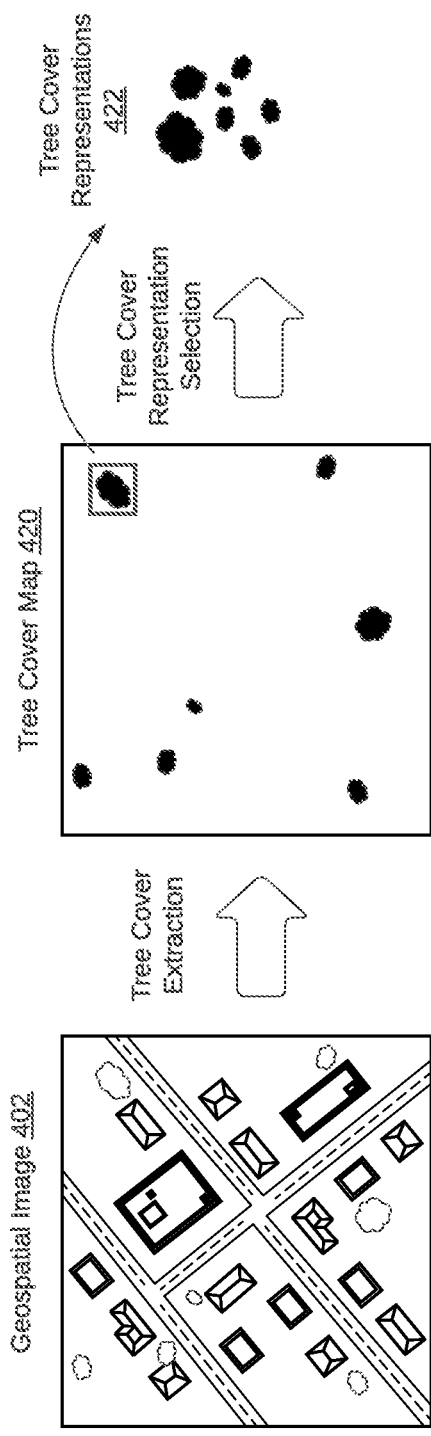
FIG. 6 illustrates an example tree cover extraction process being applied to generate a tree cover map containing tree cover representations. The tree cover representations may be used for data augmentation to create tree cover-augmented geospatial imagery for use as training data.

At operation 502, the tree cover representation generation unit 520 accesses a tree cover source image that depicts one or more areas of tree cover. The tree cover source image will generally be a geospatial image that is similar to the imagery that will be used for training, covering an area containing tree cover, some of which may be partially occluding at least some building rooftops. However, it is not strictly necessary for the tree cover source image to actually depict any instances of building rooftop occlusion, as the primary purpose of the tree cover source imagery is merely to extract realistic tree cover representations for later use. For illustrative purposes, reference may be had to FIG. 6, which depicts the geospatial image 402, which contains several buildings and several areas of tree cover, and which may serve as the "tree cover source image" for our purposes.

At operation 504, the tree cover representation generation unit 520 extracts a tree cover map from the tree cover source image. A tree cover map labels the areas of the tree cover source image as either areas covered by tree cover or not covered by tree cover. For example, the tree cover map may be in the form of a binary map, with each pixel of the tree cover source image being labeled as "1" for tree cover and "0" for not tree cover. Such a binary map may be converted from a probability distribution derived from output generated by a machine learning model. Generally speaking, such a tree cover map will contain several contiguous areas labeled as tree cover (i.e., "tree blobs") which vary in size and shape. For illustrative purposes, reference may again be had to FIG. 6, which depicts a tree cover map 420, which was extracted from the geospatial image 402, and which contains several tree cover representations 422.

At operation 506, the tree cover representation generation unit 520 selects one or more contiguous areas of tree cover (i.e., "tree blobs") from the tree cover map for use as tree cover representations. The selected tree cover representations may be cropped out of the tree cover map and stored as small raster maps. These tree cover representations may be contributed to a large repository or set of tree cover representations, which may include tree cover representations extracted from other imagery, any of which may be used in the later augmentation process. The tree cover representation generation unit 520 may store each tree cover representation in any suitable index or database for later retrieval, and may tag each tree cover representation with any suitable metadata, such as a unique identifier, an area (i.e., size) or other dimension reflecting the size of the tree cover, an indication of the image source from which it was extracted, or other information. For illustrative purposes, reference may again be had to FIG. 6, which depicts several tree cover representations 422 extracted from the tree cover map 420.

As mentioned above, the areas of tree cover may vary in size and shape. Thus, it may be desirable to extract a broad range of tree blob shapes and sizes to realistically simulate actual tree cover. However, areas of tree cover that are too large, or too small, may not be suitable for data augmentation purposes. For example, areas of tree cover that are so large as to be likely to fully occlude most buildings (rather than provide the desired partial occlusion) may be removed from selection. As another example, areas of tree cover that are so small as to be unlikely to provide any significant amount of occlusion over a building may also be removed from selection. Thus, the selection process may involve excluding from selection one or more contiguous areas of tree cover that fall outside a predetermined range of suitable tree cover area sizes.

At operation 508, the training imagery augmentation unit 530 accesses a training image and associated building rooftop polygon data. The training image is a geospatial image that depicts one or more buildings to which simulated tree cover is to be applied. The training image may be the same image as the tree cover source image or a different image. The associated building rooftop polygon data may be a set of vector data that defines the geometry and geospatial location of the building rooftops of the buildings depicted in the training image (e.g., as a set of georeferenced polygons).

Such building rooftop polygon data may be obtained by a third-party data provider, or may be generated directly, by, for example, one or more additional functional units that are run by the one or more data processing devices 220 of FIG. 2. Preferably, the building rooftop polygon data is extracted from the training image directly, to ensure geospatial alignment of the building rooftop polygons to the building rooftops as depicted in the training image. In some examples, the building rooftop polygon data may have been extracted directly from geospatial imagery by a machine learning process, such as the process described in in U.S. patent application Ser. No. 17/731,769, entitled MACHINE LEARNING FOR VECTOR MAP GENERATION, filed Apr. 28, 2022, the entirety of which is hereby incorporated by reference. Such rooftop polygon data may later be converted to building footprint data.

At operation 510, the training imagery augmentation unit 530 extracts a tree cover map from the training image. This operation may be similar, or even identical to, extracting the tree cover map from the tree cover source image at operation 504. However, at operation 504, the tree cover map was extracted for the purposes of building a set of simulated tree cover representations. Here, at operation 510, the tree cover map for the training image will be retained and used to augment the training image itself, as described below.

At operation 512, the training imagery augmentation unit 530 accesses one or more tree cover representations generated by the tree cover representation generation unit 520. Accessing the tree cover representations may involve accessing the database or other storage unit in which tree cover representations are stored, or may simply refer to receiving, looking up, or sampling the appropriate tree cover representations. One or more of these accessed tree cover representations will be added to the tree cover map for the training image.

At operation 514, the training imagery augmentation unit 530 matches together buildings in the training image, for which the associated building rooftop polygon data is available, to the appropriate tree cover representations generated by the tree cover representation generation unit 520, that will be used to augment the buildings with simulated tree cover. Any suitable proportion of buildings in the training image may be augmented in this way (e.g., 25%, 50%, 75%, or 100% of buildings). In some cases, buildings which are already occluded by tree cover (as determined by searching the tree cover map extracted from the training image for overlap with associated building rooftop polygon data) may be excluded from further augmentation.

Figure 7:
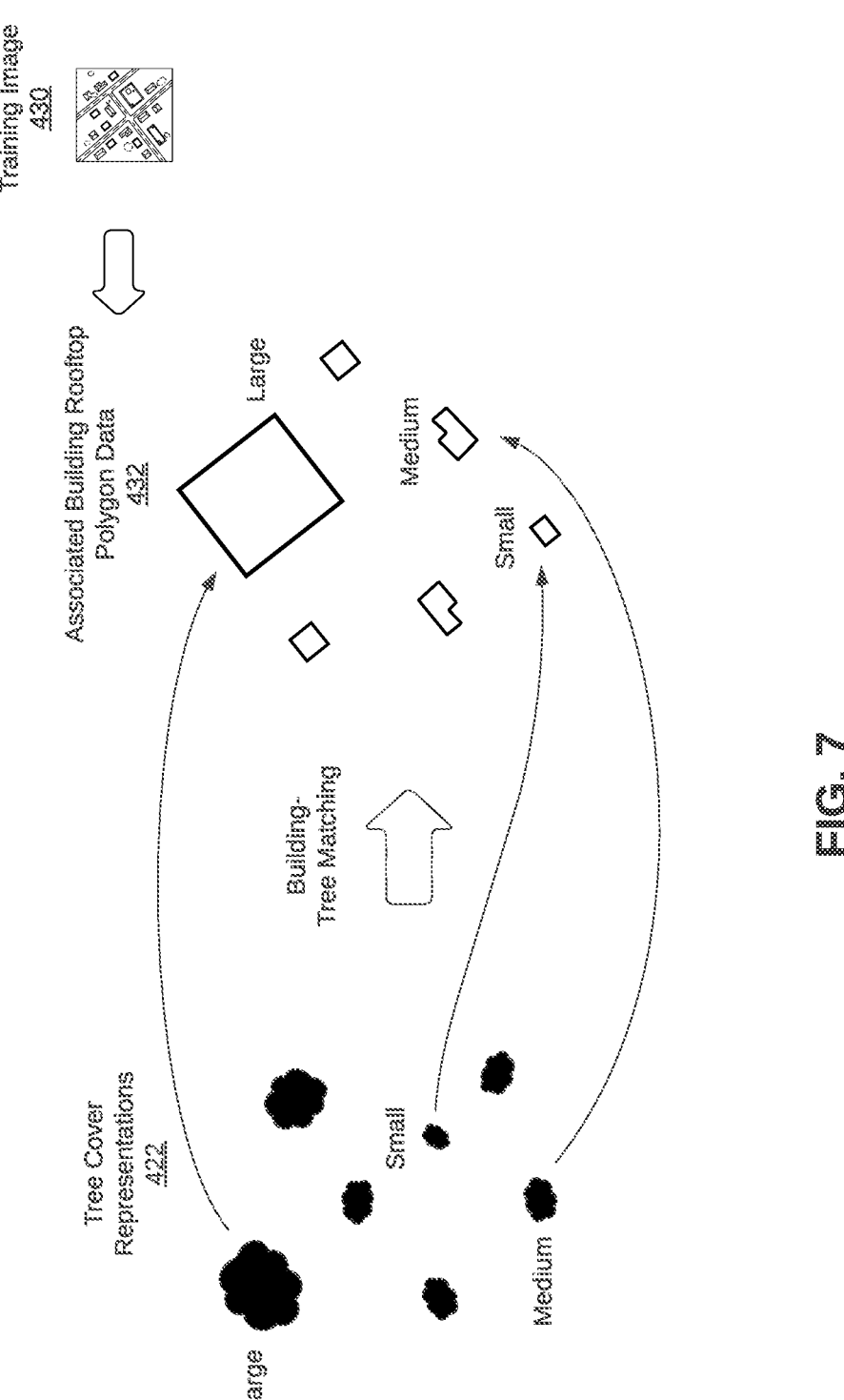
FIG. 7 illustrates an example building-tree matching process in which simulated tree cover representations, which are to be used for data augmentation in the creation of tree cover-augmented geospatial imagery, are matched to the appropriate buildings in training imagery.

The buildings in the training image may be matched to simulated tree cover representations according to one or more criteria. For example, buildings may be matched to tree cover representations based on relative size. Larger buildings may be matched with larger tree cover representations, and smaller buildings may be matched with smaller tree cover representations. The actual size of a tree cover representation can be determined with reference to scale information embedded in the tree cover source image from which the tree cover map was extracted (or any other indication of scale), whereas the size of a building rooftop polygon can similarly be determined with reference to scale information embedded in the imagery from which the building rooftop polygon vector data was extracted (or any other indication of scale). One way to numerically match buildings to tree cover representations is based on the intersection-over-union ("IOU") metric, whereby buildings may be matched to tree cover representations depending on whether the match would result in an IOU value that falls within an acceptable range. The aim is to use simulated tree cover to provide occlusion that is significant enough that it is worth training a machine learning model to overcome the occlusion, without providing so much occlusion that the rooftop polygons cannot be accurately extracted at all. For illustrative purposes, reference may be had to FIG. 7, which depicts the set of tree cover representations 422 being matched to the building rooftop polygon data 432 associated with a training image 430 based on relative size (i.e., matching together "large", "medium", and "small" buildings to tree cover representations).

At operation 516, once a tree cover representation is matched to its target building, optionally, the training imagery augmentation unit 530 may apply a transformation to the selected tree cover representation. In some cases, the raw tree cover representation (i.e., directly extracted from the tree map) may be used. In other cases, to expand the breadth of data augmentation, a transformation such as a rotation, flip, or scaling, may be applied to the tree cover representation, before being placed in the training image.

Figure 8:
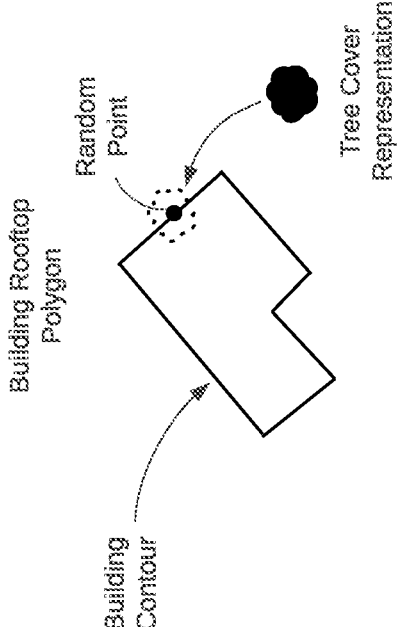
FIG. 8 illustrates an example placement of a tree cover representation on the contour of a building rooftop polygon in a tree cover-augmented geospatial image.

At operation 518, the training imagery augmentation unit 530 places each of the selected tree cover representations in the training image at locations that occlude the buildings to which the tree cover representations were matched. The precise locations may be random points on or near the outer edges of the buildings. In other words, the training imagery augmentation unit 530 selects a random location on or near the outer contours of each building rooftop polygon for the matching building. In many cases, it will be simplest to place the tree cover representation directly on the contour of the building. In some cases, however, the tree cover representation may be offset from the contour of the building, generally away from the center of the building, by a small distance. For illustrative purposes, reference may be had to FIG. 8, which shows an example building rooftop polygon with a random point on its contour onto which a tree cover representation is to be placed.

As mentioned above, the tree cover map may be in the form of a binary map. In such cases, the selected tree cover representations may be "placed" in the training image by applying the tree cover map, including any additional tree cover representations that are added to the tree cover map, as a mask to the training imagery. The binary map may be applied to the training image by, for example, applying elementwise multiplication. To give a numerical example, a training image of dimensionality 256×256×3 (i.e., an RGB image) may undergo elementwise multiplication against a tree cover map of matching height and width 256×256×1 (i.e., a binary map), to produce a tree cover-augmented image of the original dimensionality (i.e., 256×256×3), with the areas of tree cover zeroed out (i.e., with RGB values [0,0,0]). This tree cover-augmented image 440 may be further processed by a machine learning model in the same way that the raw geospatial image 402 might have been, with the difference that there are several more instances of tree occlusion, which can be leveraged to train the machine learning model to overcome such occlusions.

Figure 9:
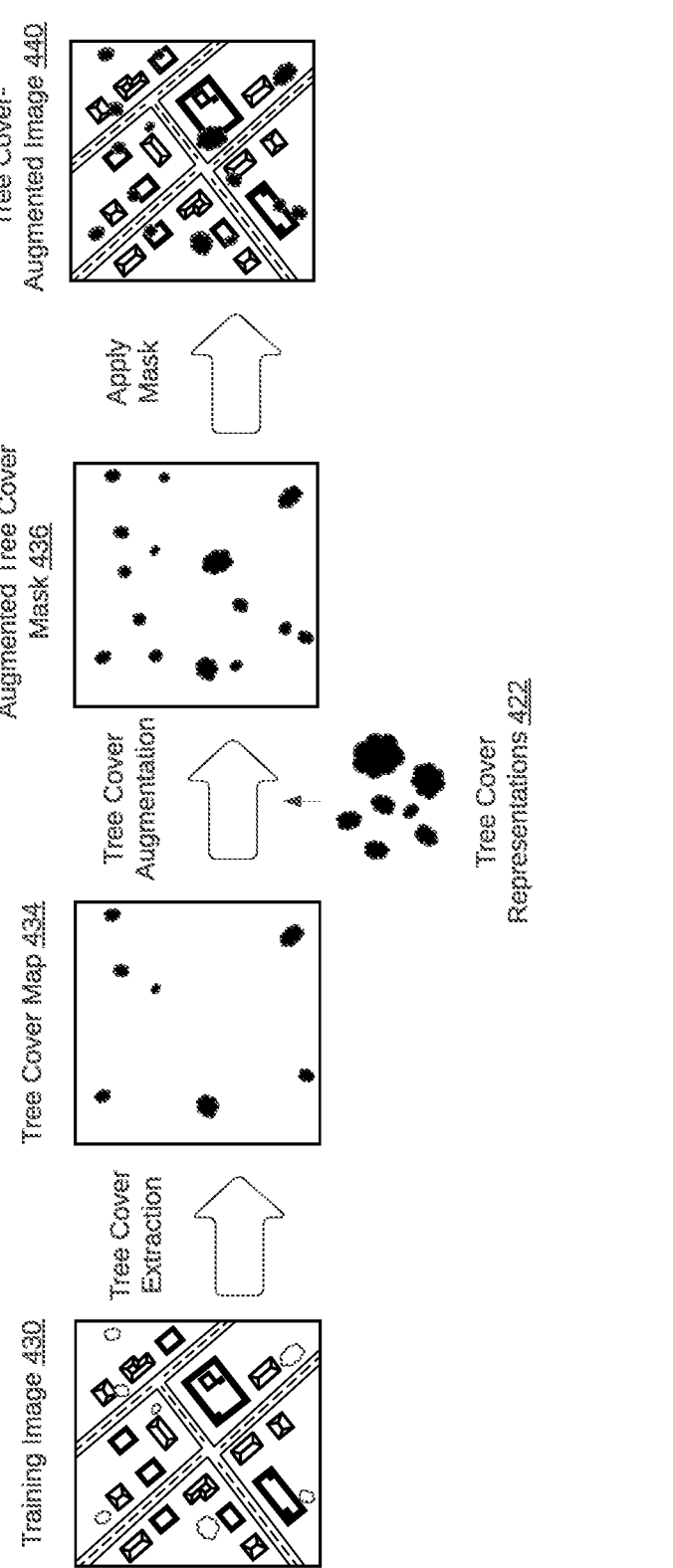
FIG. 9 illustrates an example tree cover augmentation process.

For illustrative purposes, reference may be had to FIG. 9, which shows the training image 430, the tree cover map 434 extracted from the training image 430, an augmented tree cover mask 436 formed by adding the tree cover representations 422 (sampled from other imagery) to the tree cover map 434, and a tree cover-augmented image 440 formed by applying the augmented tree cover mask 436 to the training image 430.

As previously mentioned, the method 500 describes one way in which tree cover-augmented geospatial imagery may be generated for use as training data. Thus, the method 500 may be understood as describing one way in which the operation 304 of the method 300 of FIG. 3 may be performed. Further, the method 500 may be understood as describing one example way in which training data for the machine learning model that is part of the occlusion-handling building rooftop polygon extractor 222 of FIG. 1 may be generated. It is to be noted, however, that the method 500 may be applied in other systems, and that generally the method 500 and any of its operations may be organized in one or more functional units and embodied in non-transitory machine-readable programming instructions executable by one or more processors in any suitable configuration.

Figure 10:
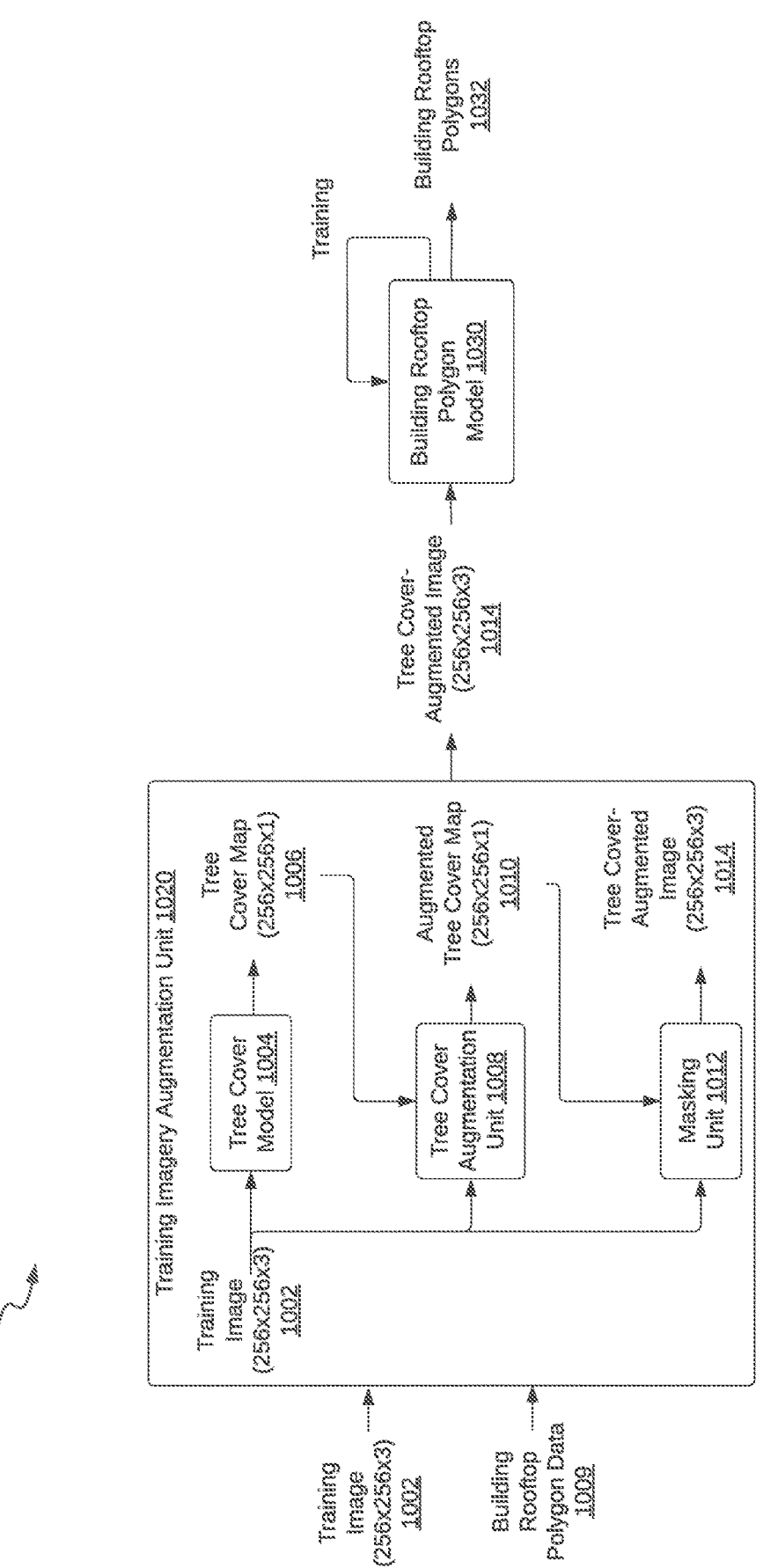
FIG. 10 is a schematic diagram of an example building rooftop polygon extractor that is configured to handle partial tree occlusion, with a machine learning model depicted in training.

FIG. 10 is a schematic diagram of an example building rooftop polygon extractor 1000 that is configured to handle partial tree occlusion. At a high level, the building rooftop polygon extractor 1000 includes a building rooftop polygon model 1030, which includes a machine learning model, which is to be trained to extract building rooftop polygons from tree cover-augmented imagery. The building rooftop polygon extractor 1000 also includes a training imagery augmentation unit 1020 to convert raw training images into the tree cover-augmented imagery for training the building rooftop polygon model 1030.

The training imagery augmentation unit 1020 accesses a training image 1002 (of dimensionality, for example, 256×256×3 as an RGB image). The training image 1002 is processed by a tree cover model 1004 that is configured to extract a tree cover map 1006 from the training image 1002. The tree cover map 1006 may be in the form of a binary map, converted from a probability distribution derived from output generated by a machine learning model. Continuing with the numerical example, the tree cover map 1006 may be of initial dimensionality 256×256×2 as a probability distribution followed by 256×256×1 as a binary map.

The tree cover map 1006 is processed by a tree cover augmentation unit 1008 to generate an augmented tree cover map 1010. The augmented tree cover map 1010 comprises the original tree cover map 1006 extracted from the training image 1002, with the addition of one or more simulated tree cover representations, placed in the tree cover map 1006 at locations that correspond to locations that occlude one or more building depicted in the training image 1002. The additional tree cover representations may comprise sampled tree cover representations, in the form of binary maps, that were extracted from other imagery, and may have gone through one or more transformations (e.g., flips, rotations). In order to place the simulated tree cover representations in the appropriate locations, the tree cover augmentation unit 1008 also accesses building rooftop polygon data 1009, so that simulated tree cover representations can be placed on or near the outer contour of buildings.

The augmented tree cover map 1010 is processed by a masking unit 1012 to generate a tree cover-augmented image 1014. The masking unit 1012 applies the augmented tree cover map 1010 to the training image 1002 so that the areas of tree cover become incorporated into the training image 1002 as areas that are zeroed out (i.e., with RGB values [0,0,0]).

The tree cover-augmented image 1014 is then processed by the building rooftop polygon model 1030 to produce building rooftop polygons 1032. As described elsewhere in this disclosure, such building rooftop polygons 1032 may comprise vector data that defines the geometry and geospatial location of the building rooftops of the buildings depicted in the training image 1002 (e.g., as a set of georeferenced polygons). Given the set of ground truth vector data for building rooftop polygons in the training image 1002, any suitable loss function and training techniques may be applied to train the building rooftop polygon model 1030. The architecture of the machine learning model may comprise any suitable deep learning architecture, including one or more neural networks, convolutional neural networks, U-Net convolutional networks, Long Short-Term Memory (LSTM) networks, visual transformers, or other neural network-based architectures, or the architecture described in U.S. patent application Ser. No. 17/731,769, entitled MACHINE LEARNING FOR VECTOR MAP GENERATION, filed Apr. 28, 2022, mentioned above.

Each of the functional units of the building rooftop polygon extractor 1000, which are depicted separately for illustrative purposes only, may be organized in any suitable combination of functional units, software systems, or sets of non-transitory machine-readable programming instructions, and executable by one or more processors in any suitable configuration.

Figure 11:
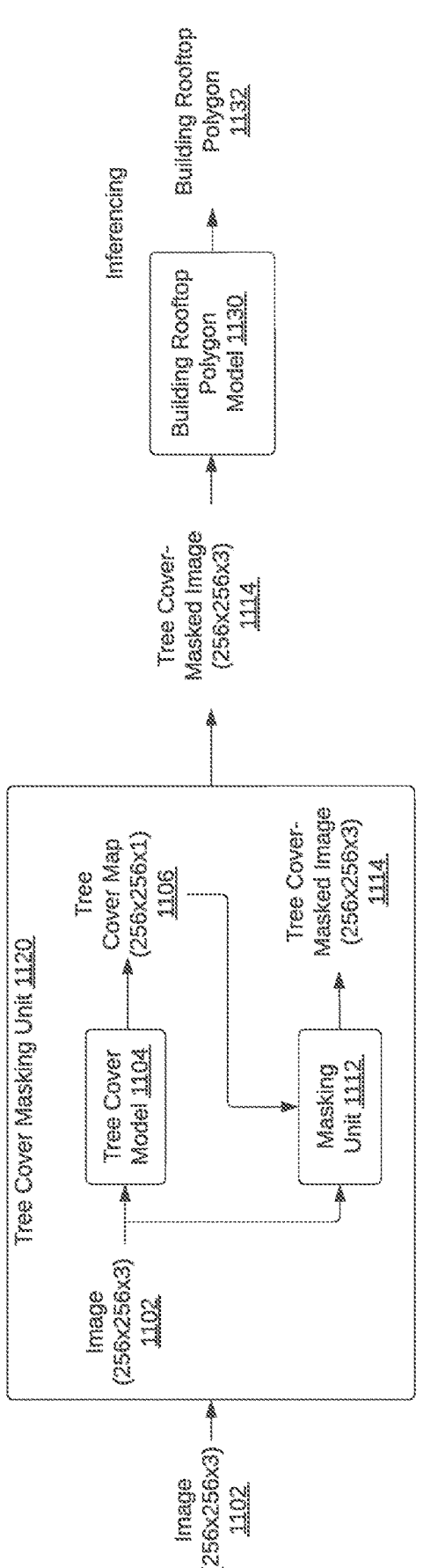
FIG. 11 is a schematic diagram of an example building rooftop polygon extractor that is configured to handle partial tree occlusion, with a machine learning model depicted in inferencing.

FIG. 11 is a schematic diagram of an example building rooftop polygon extractor 1100 that is configured to handle partial tree occlusion. The building rooftop polygon extractor 1100 may be understood to be similar to the building rooftop polygon extractor 1000 of FIG. 10, but configured for inferencing, rather than training. The building rooftop polygon extractor 1100 therefore includes a machine learning model which has been trained to extract building rooftop polygons from imagery, including tree cover-augmented imagery. However, unlike in FIG. 10, the building rooftop polygon extractor 1100 includes a tree cover masking unit 1120, which masks the areas of tree cover depicted in images containing tree cover, without augmenting the images with additional tree cover. This masking is a form of pre-processing that prepares the image into a form that the machine learning model is expecting.

As in FIG. 10, the tree cover masking unit 1120 accesses a geospatial image 1102 (of dimensionality, for example, 256×256×3 as an RGB image). The geospatial image 1102 is processed by a tree cover model 1104 that is configured to extract a tree cover map 1106 from the geospatial image 1102. The tree cover model 1104 and tree cover map 1106 may be similar to those described in FIG. 10.

However, unlike as in FIG. 10, the tree cover map 1106 is then directly processed by a masking unit 1112, to generate a tree cover-masked image 1114, without any augmentation.

The resulting tree cover-masked image 1114 is then processed by the building rooftop polygon model 1130 to produce building rooftop polygons 1132. Since the building rooftop polygon model 1130 has been exposed to many instances of tree cover occlusion in training data, it is to be expected that the building rooftop polygon model 1130 will be able to accurately extract building rooftop polygons 1132 despite partial tree occlusion present in the geospatial image 1102.

As in FIG. 10, each of the functional units of the building rooftop polygon extractor 1100, which are depicted separately for illustrative purposes only, may be organized in any suitable combination of functional units, software systems, or sets of non-transitory machine-readable programming instructions, and executable by one or more processors in any suitable configuration.

The present disclosure therefore provides systems and methods for data augmentation for occlusion handling in feature extraction, with particular details provided for the case of tree cover occlusion of buildings. Variations in these details are contemplated. For example, although it is described throughout that building rooftop polygons are to be extracted as vector data, it is contemplated that the present disclosure may be applied to models that extract representations of building rooftops as raster data. In such a case, tree cover representations may be placed in training imagery with reference to georeferenced raster data in a similar way as vector data as described above (considering that the building contour is provided in raster data or is otherwise determinable), with minimal alterations to the remaining processes.

As mentioned above, the systems and methods described herein may be applied to other combinations of occluding and occluded features. For example, as illustrated in FIG. 12B, a road extraction model may be trained to extract road data from imagery in which areas of the road are partially occluded by trees. In such an example, augmented training imagery may be generated by adding instances of tree cover over roads, using ground truth road data to position the tree cover in areas that partially occlude the roads.

As another example, as illustrated in FIG. 12C, a building rooftop polygon model may be trained to extract building rooftop polygons from imagery in which buildings are partially occluded by clouds. In such an example, a cloud model, similar to the tree model described herein, may be used to extract a cloud map from an image, and this cloud map may be further augmented by additional instances of cloud cover. Similar to the case with tree cover, selection mechanisms for filtering out cloud cover representations that are too large, or too small, and placing cloud cover representations in locations that partially occlude buildings, may be applied. In inferencing, the cloud model may be used similar to the tree model, to prepare the building rooftop polygon model for the cloud-masked imagery that it is expecting. As illustrated in FIG. 12D, the same principles may be applied to road extraction.

Other combinations of landcover features may also be applicable. In general, the techniques described herein may be applied in any case in which it is desired to perform feature extraction on an occludable landcover feature depicted in geospatial imagery in which one or more occluding landcover features may be present.

In such a general case, a method for feature extraction of an occludable landcover feature may involve: accessing a geospatial image depicting an occludable landcover feature and an occluding landcover feature that partially occludes the occludable landcover feature. The method may further placing the simulated tree cover at the selected location.

involve extracting an occlusion map from the geospatial image, wherein the occlusion map labels areas of the geospatial image as areas either covered by the occluding landcover features or not covered by the occluding landcover features. The method may further involve applying the occlusion map as a mask to the geospatial image to generate an occluding feature-masked geospatial image. The method may further involve applying a machine learning model to the occluding feature-masked geospatial image to extract a geometric representation of the occludable landcover feature as depicted in the geospatial image, wherein the machine learning model is trained using occluding feature-augmented geospatial imagery to extract geometric representations of occludable landcover features as depicted in geospatial imagery.

Further, in such a general case, a method for training a machine learning model for feature extraction of an occludable landcover feature may involve: accessing a geospatial image depicting an occludable landcover feature, augmenting the geospatial image with a simulated occluding landcover feature to generate an occluding feature-augmented geospatial image, wherein the simulated occluding landcover feature partially occludes the occludable landcover feature as depicted in the geospatial image. A machine learning model may then be trained using the occluding feature-augmented geospatial image to extract geometric representations of occludable landcover features as depicted in geospatial imagery.

It should be recognized that features and aspects of the various examples provided above can be combined into further examples that also fall within the scope of the present disclosure. The scope of the claims should not be limited by the above examples but should be given the broadest interpretation consistent with the description as a whole.

The invention claimed is:

1. A method comprising:
   accessing a tree cover source image that depicts one or more areas of tree cover;
   extracting a tree cover map from the tree cover source image, wherein the tree cover map labels areas of the tree cover source image as either areas covered by tree cover or not covered by tree cover;
   selecting a contiguous area of tree cover from the tree cover map to use as simulated tree cover;
   accessing a geospatial image depicting a building;
   placing the simulated tree cover in the geospatial image to generate a tree cover-augmented geospatial image, wherein the simulated tree cover partially occludes a rooftop of the building as depicted in the geospatial image; and
   training a machine learning model, using the tree cover-augmented geospatial image, to extract building rooftop polygons outlining buildings as depicted in geospatial imagery.

2. The method of claim 1, wherein the simulated tree cover is in the form of a binary map, and wherein placing the simulated tree cover in the geospatial image involves applying the binary map as a mask to the geospatial image.

3. The method of claim 1, further comprising:
   applying a transformation to the simulated tree cover before placement in the geospatial image.

4. The method of claim 1, wherein placing the simulated tree cover in the geospatial image comprises:
   accessing georeferenced building rooftop polygon data that indicates the outer contours of the building;
   selecting a location on or near the outer contours of the building; and 5. The method of claim 1, wherein the method further comprises:
   accessing georeferenced building rooftop polygon data that indicates the size of the building; and
   matching the simulated tree cover to the building based on a relative size of the simulated tree cover to the building.

6. The method of claim 1, wherein selecting the contiguous area of tree cover from the tree cover map comprises excluding from selection one or more contiguous areas of tree cover that fall outside a predetermined range of suitable tree cover area sizes.

7. A method comprising:
   accessing a source image that depicts one or more areas covered by an occluding landcover feature;
   extracting an occluding feature map from the source image, wherein the occluding feature map labels areas of the source image as either areas covered by the occluding landcover feature or not covered by the occluding landcover feature;
   selecting a contiguous area of the occluding landcover feature from the occluding feature map to use as a simulated occluding landcover feature;
   accessing a geospatial image depicting an occludable landcover feature;
   placing the simulated occluding landcover feature in the geospatial image to generate an occluding feature-augmented geospatial image, wherein the simulated occluding landcover feature partially occludes the occludable landcover feature as depicted in the geospatial image; and
   training a machine learning model, using the occluding feature-augmented geospatial image, to extract geometric representations of occludable landcover features as depicted in geospatial imagery.

8. The method of claim 7, wherein:
   the occluding landcover feature comprises tree cover; and
   the occludable landcover feature comprises a building.

9. The method of claim 7, wherein:
   the occluding landcover feature comprises tree cover; and
   the occludable landcover feature comprises a road.

10. The method of claim 7, wherein:
    the occluding landcover feature comprises cloud cover; and
    the occludable landcover feature comprises a building.

11. The method of claim 7, wherein:
    the occluding landcover feature comprises cloud cover; and
    the occludable landcover feature comprises a road.

12. A system comprising one or more computing devices configured to:
    access a source image that depicts one or more areas covered by an occluding landcover feature;
    extract an occluding feature map from the source image, wherein the occluding feature map labels areas of the source image as either areas covered by the occluding landcover feature or not covered by the occluding landcover feature;
    select a contiguous area of the occluding landcover feature from the occluding feature map to use as a simulated occluding landcover feature;
    access a geospatial image depicting an occludable landcover feature;
    place the simulated occluding landcover feature in the geospatial image to generate an occluding feature-augmented geospatial image, wherein the simulated occluding landcover feature partially occludes the occludable landcover feature as depicted in the geospatial image; and train a machine learning model, using the occluding feature-augmented geospatial image, to extract geometric representations of occludable landcover features as depicted in geospatial imagery.

13. The system of claim 12, wherein:

the occluding landcover feature comprises tree cover; and the occludable landcover feature comprises a building.

14. The system of claim 12, wherein the simulated occluding landcover feature is in the form of a binary map, and wherein placing the simulated occluding landcover feature in the geospatial image involves applying the binary map as a mask to the geospatial image.

15. The system of claim 12, wherein the one or more computing devices are further configured to:

access data that indicates the size of the occludable landcover feature; and match the simulated occluding landcover feature to the occludable landcover feature based on a relative size of the simulated occluding landcover feature to the occludable landcover feature.

* * * * *